Figure 1:
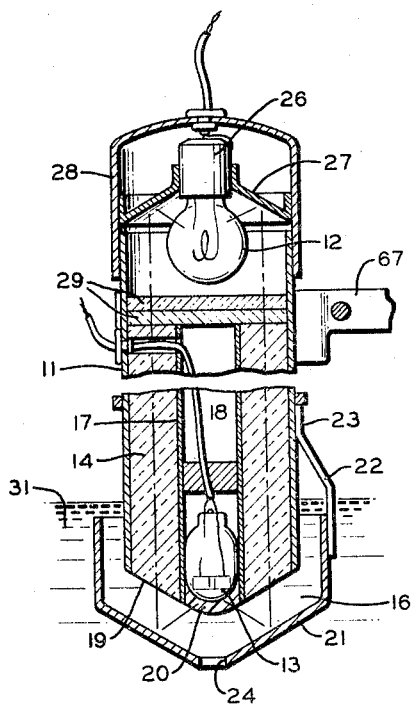

Aug. 2, 1966  H. BARUCH  3,263,553
PHOTOELECTRIC IMMERSION PROBE
Filed Dec. 12, 1961  2 Sheets-Sheet 1

INVENTOR.
HANS BARUCH
BY
Schapp & Hatch
ATTORNEYS

Aug. 2, 1966 H. BARUCH 3,263,553
PHOTOELECTRIC IMMERSION PROBE
Filed Dec. 12, 1961 2 Sheets-Sheet 2

INVENTOR.
HANS BARUCH
BY *Schapp & Hatch*
ATTORNEYS

United States Patent Office 3,263,553
Patented August 2, 1966

3,263,553
PHOTOELECTRIC IMMERSION PROBE
Hans Baruch, Berkeley, Calif., assignor, by mesne assignments, to Warner-Lambert Pharmaceutical Company, Morris Plains, N.J.
Filed Dec. 12, 1961, Ser. No. 159,206
3 Claims. (Cl. 88—14)

The present invention relates to improvements in an optical analyzer and particularly to a photoelectric analyzer capable of gathering data relating to optical properties of a liquid.

Optical analyzers capable of measuring light or color intensity have been used extensively to make certain types of determinations and particularly chemical analyses. In such instruments, light from a controlled light source is passed through a fixed distance of sample and to a light-sensing means such as a photoelectric cell.

For example, a colorimetric determination may be made using this type of apparatus by placing the colored sample in place and reading a deflection in a galvanometer connected to the photocell. The percentage of light transmitted through the solution is thus represented by the deflection of the galvanometer, and this value may be translated into concentration of colored matter from a prepared chart calibrated from standard samples. Increased accuracy may be obtained by using color filters which allow transmittance of a desired portion of the spectrum. In addition to light, other optical properties may be measured such as polarizing effect, rotation of plane polarized light, photo-luminescence and photo-phosphorescence.

Other optical analytic systems such as qualitative indications belong in the class applicable to the present invention. For example, determination of a color indicator used either qualitatively or in connection with a quantitative determination may be accomplished. Other analyses may be made by measuring the response of a sample to different wavelengths of light, including the invisible light ranges. In other words, the determination may be made by color, light transmissibility, light reflecting properties, fluorescence in response to ultraviolet light, other ultraviolet light measurements, infrared adsorption, and other optical properties.

In such analytic systems, it has been a usual practice to transfer the sample to an apparatus suitable for measuring the desired optical data. It has also been known to use such an apparatus for determining an optical property of a material in a line where the material is flowing. While these systems may be satisfactory to give certain desired analyses, they are not readily adapted to be used in an automatic analyzer capable of making a large number of determinations on a plurality of independent samples in a comparatively short time.

It is a primary object of this invention to provide an optical analyzer capable of such automatic analysis by utilizing an apparatus which can readily be dipped into the sample to be analyzed and which is adapted to be removed from the sample, cleaned and placed in another sample to be analyzed.

Another object of the invention is to provide an optical analyzer in the form of a probe that utilizes a unique combination of light responsive and light conditioning and transmitting components.

A further object of the invention is to provide an optical probe of the character described that gives consistently accurate results and yet which is comparatively simple in construction.

Still another object of the invention is the provision of an optical analyzer of the character described capable of analyzing small samples held in elongated tubes.

Further objects and advantages of my invention will be apparent as the specification progresses, and the new and useful features of my photoelectric immersion probe will be fully defined in the claims attached hereto.

In general, these objects are accomplished by an optical analyzer capable of being immersed into a liquid sample, comprising a light source, a light-conditioning means, a light-sensing element capable of producing an informational signal in response to light impinging thereon, and means for directing light from the light source through the light-conditioning means and sample to the light-sensing element.

The analyzer may be used in any convenient manner, such as insertion in the sample by hand or by a mechanized system. Any standard laboratory set-up may be used capable of holding probelike instruments to support the analyzer in place, if desired. The apparatus is particularly suitable for use with small samples, which may be contained in a small test tube or a small sample tube.

In addition, the optical analyzer may also be utilized in an automated system such as that disclosed and claimed in the co-pending United States patent application of Erik W. Anthon filed October 7, 1960, and entitled Materials Handling Apparatus, now United States Patent No. 3,178,266 issued April 13, 1965. The Anthon apparatus is capable of handling samples to and from work stations and also of handling probelike elements so as to insert them into and bring them out of samples. In this way, automatic analytical operations are carried out both accurately and efficiently.

Figure 2:
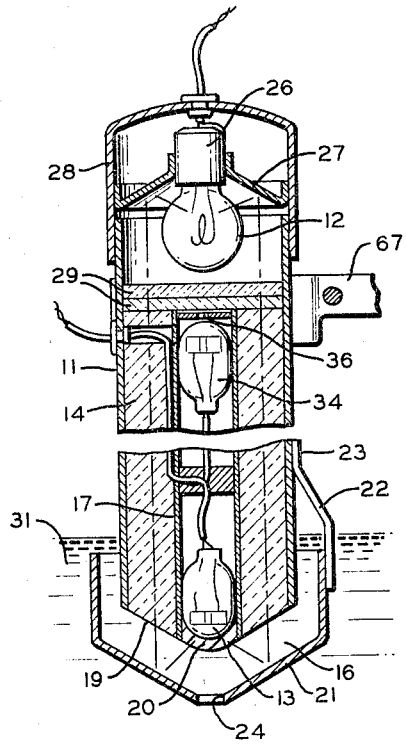
Figure 3:
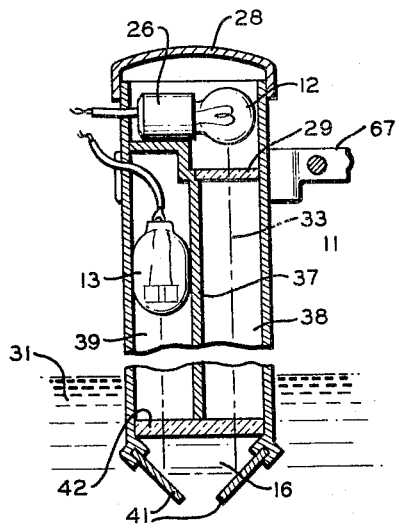
Figure 4:
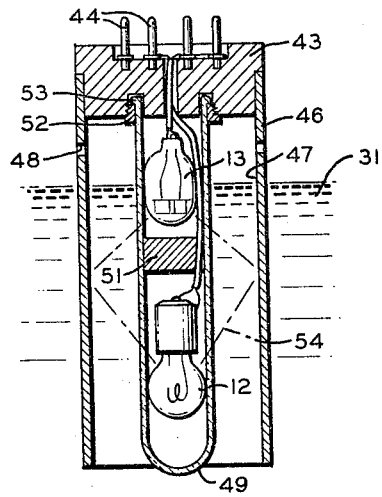
Figure 5:
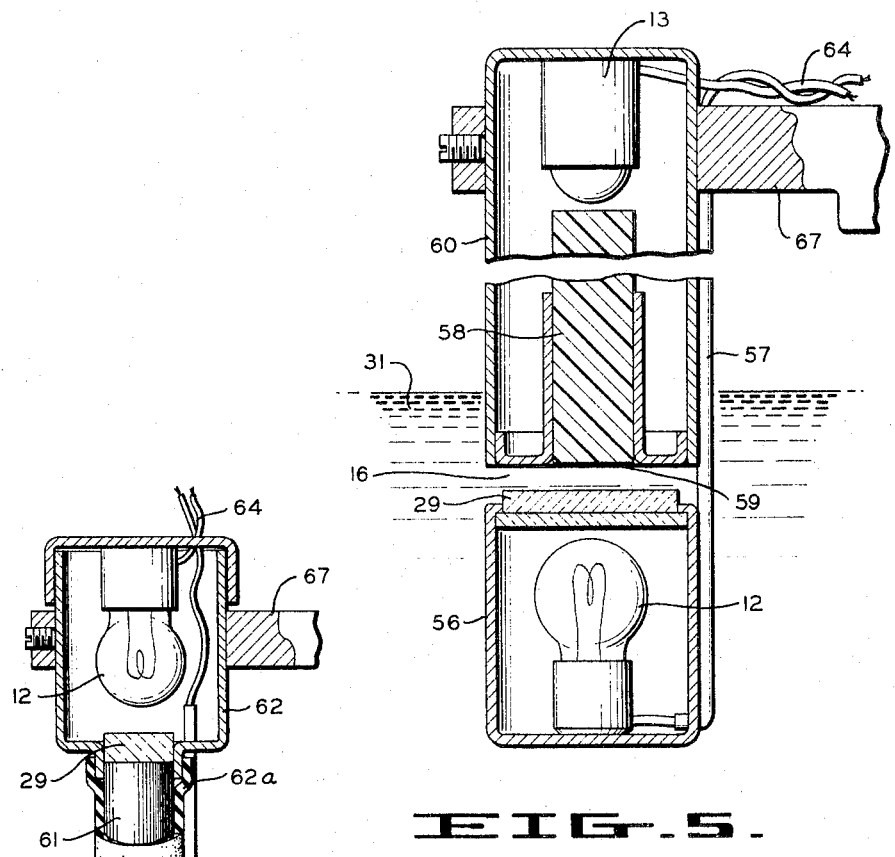
Figure 6:
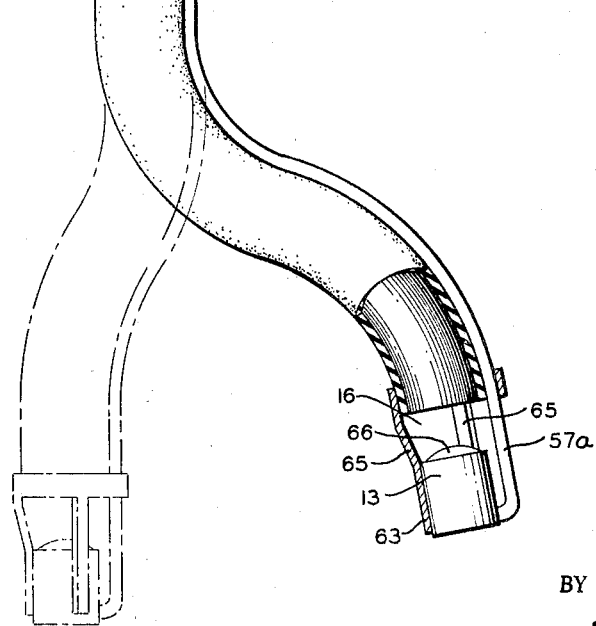

The preferred form of the invention is shown in the accompanying drawing, forming a part of this specification, in which:

FIGURE 1 is a cross-sectional view of one form of optical analyzer constructed according to the invention;

FIGURE 2, a cross-sectional view of another form of an optical analyzer of this invention;

FIGURE 3, a cross-sectional view of still another embodiment of the optical analyzer of this invention;

FIGURE 4, a cross-sectional view of a further embodiment of the optical analyzer of the invention;

FIGURE 5, a cross-sectional view of a still further embodiment of the invention; and FIGURE 6, a cross-sectional view of yet another embodiment of the invention.

While I have shown only the preferred forms of my invention, it should be understood that various changes or modifications may be made within the scope of the claims attached hereto without departing from the spirit of the invention.

Referring to the drawing in detail, there is shown in FIGURE 1 an optical analyzer which includes a housing 11 having a light source consisting of an incandescent lamp 12, together with a light-sensing means such as photoelectric cell 13 suitably mounted therein. Housing 11 is a generally cylindrical, opaque structure which carries a section of glass or quartz tubing 14 within capable of transferring light from the light source 12 downwards toward a chamber 16 adapted to receive a sample. On the inner wall of the glass tube 14 is a metal foil or opaque coating 17 which shields the unit from external light.

Photoelectric cell 13 is mounted within the metal foil 17 and is shielded from external light by both the foil 17 and opaque barrier 18. Chamber 16 is defined by wall 19 of glass tube 14, the surface of a translucent potting compound 20, and the upper wall of reflector 21. In order to adjust the size of chamber 16, reflector 21 is adjustably mounted by brackets 22 which are fastened to the reflector by welding, brazing or the like and which resiliently press against the outer walls of the housing 11 through fingers 23. In order to facilitate entry and removal of sample from chamber 16, a drain hole 24 is provided in the bottom of the reflector.

Light 12 may be an incandescent lamp as shown in the drawing, or it may be a different type of light source such as gas discharge, electronic flash or fluorescent light. However it is preferred to use a small lighting unit and extremely small incandescent lights are commercially available. In the embodiment of FIGURE 1, light 12 is mounted in an electric socket 26 which in turn is held in reflector 27. A removable end 28 of the housing 11 is provided to hold the reflector in place and yet allow the bulb and other components to be easily replaced when necessary or desirable.

When an incandescent light is used, it is often desirable or necessary to regulate the characteristics of the light passing through the sample by suitable filters 29 or any equivalent means. The filter may be colored glass or it may be a unit capable of providing color interference or fluorescence.

The light-sensing element may be any unit capable of translating an optical measurement into an electric signal. Preferably a photoelectric cell is used, and this cell may be photovoltaic such as copper oxide and selenium, photoconductive such as cadmium selenide, cadmium sulfide or phototransistors, or photoemissive such as vacuum or gas units, phototubes or photomultipliers.

In operation, the optical analyzer is immersed into a sample 31 which is held in a sample tube or container. Upon immersion, sample enters chamber 16 where it is in position to be optically measured. Light is then passed from light source 12, through filter 29, glass tube 14, through the sample, and reflected to the light-sensing element 13. A signal from the light-sensing element is then shown on a meter or recorder using conventional systems. When a photoelectric cell is used as the light-sensing element, the signal may be metered on a galvanometer (not shown) or sent through a suitable amplifier (not shown) and metered or recorded.

The embodiment illustrated in FIGURE 2 is similar to that shown in FIGURE 1, except that a reference photoelectric cell 34 is included to indicate a zero point from light source 12 through filter 29 and pinhole aperture 36. In addition, changes in light intensity and other factors that might influence the accuracy of the optical measurement can be detected. In other words, the purpose of the reference is to monitor the intensity of the light that has not passed through the liquid. A comparison of this light intensity with the intensity of the light that has passed through the liquid gives a measure of the light absorption in the liquid and compensates for the effects of variations in intensity of the light emitted by the lamp.

In the embodiment shown in FIGURE 3, housing 11 and its end 28 are similar to that shown in FIGURE 1 and so are the light source 12, photoelectric cell or light-sensing element 13 and filter 29. However, an opaque barrier 37 is provided within the housing to divide the space into a light shaft 38 and a light shaft 39. Sample chamber 16 is formed by an opposed pair of reflectors 41 carried on the lower end of housing 11 and by a glass or quartz plate 42.

The operation of the embodiment of FIGURE 3 is similar to that of FIGURE 1, with the light passing from light source 12 through filter 29, light shaft 38, glass plate 42, through the sample in three directions as directed by reflectors 41, back through glass plate 42, and to the light-sensing element 13 as indicated by line 33.

The embodiment shown in FIGURE 4 is similar in operation to the other embodiments but shows a unit in which the light source is below the light-sensing element. As shown in the drawing, this form comprises a support member 43 carrying suitable electric plugs 44 that are electrically connected to light source 12 and light-sensing element 13. The support member 43 also carries a cylindrical housing 46 having a reflective inner surface 47 and air vents 48 to facilitate ingress and egress of sample within the housing. Glass tube 49 is also carried on support member 43 and holds the light source 12 and the light-sensing element 13 out of contact with the sample. An opaque barrier 51 is also provided between the light source and light-sensing element. Tube 49 may be removably held on member 43 by a ring 52, which is threaded into member 43 and holds the lip 53 of the glass tube. This allows easy disassembly so that replacement of light bulb 12 and other repairs or adjustments are facilitated.

The operation of the embodiment of FIGURE 4 is similar to that of the other embodiments. For example, the optical analyzer is immersed into the sample and the sample flows into the annular space between the cylindrical housing 46 and the glass tube 49. Light from source 12 then passes through the sample and reflects from wall 47 back to the light-sensing element 13 as indicated by line 54.

Glass tube 49 may be of clear glass or it may be colored to serve as a filter. When used as a filter, easy changes may be effected by the structure shown so as to allow a variety of filters to be used.

The embodiment shown in FIGURE 5 utilizes plastic rods having the property of transmitting light axially through the fiber to transmit light from the sample areas to the elements well above the sample. As shown, the optical probe comprises a light source or incandescent lamp 12, light-sensing element or photoelectric cell 13, and a chamber 16 for receiving the sample. The light source 12 is held in a liquid-tight housing 56 which is held in place by conduit 57 and brackets (not shown). Conduit 57 also carries wires for supplying electric power to the light source.

Housing 56 is also formed to hold light filter 29 in place within chamber 16. The light-transferring passage used in the embodiment of FIGURE 5 is a single plastic rod 58. This plastic material has a lower face 59 forming part of chamber 16 and an upper face directed toward light-sensing element 13. As shown in the drawing, chamber 16 of FIGURE 5 holds a fixed distance of sample between the lower face of the plastic material and the upper face of filter 29. Accordingly, the thickness of the sample measured may be adjusted by using filters of various thicknesses.

An upper housing 60 is provided to support light sensing element 13 and hold plastic rod 58 in position as well as to keep out any stray light. In addition, the inner surface of the housing may be coated with a black or light-absorbing material so as to absorb light which does not directly impinge upon the photoelectric cell or light-sensing element.

The embodiment of FIGURE 6 is similar to that of FIGURE 5 except that certain of the parts are reversed, and the probe of FIGURE 6 has the advantage of being flexible. Other arrangements of parts are also possible without departing from the scope of the invention. FIGURE 6 also shows a probe in which the light-transmitting plastic is a plurality of fibers or rods 61 that serve a similar function as the single rod 58 of FIGURE 5. In both cases, the light-transmitting plastic may be cellulose acetate or any other suitable material, such as acrylic resins, which have the property of transmitting light from one end to the other and have their sides polished to prevent dispersion of light therethrough to the outside.

Thus, the embodiment of FIGURE 6 also has a light source 12, light-sensing means 13, chamber 16 for receiving the sample, light-transmitting plastic fibers or rods 61, and filter 29. Light source 12 is shown as an incandescent lamp housed in a suitable housing 62 which also extends downward to hold the filter and flexible shield 62a. Flexible shield 62a may be made of any suitable flexible material which is opaque to light, suitable materials for the purpose including but not being limited to solid sheaths of plastic including rubber, fabrics, flexible coatings on the fibers, or the like. Light-sensing means 13 may be a photoelectric cell housed in a liquid-tight housing 63 having a glass top 66. The housing is held in place by flexible conduit 57a and brackets 65 which are attached to wires 64. These wires are also carried in conduit 57a to bring the signal back to the indicating or recording instruments (not shown).

An important feature of the embodiment of FIGURE 6 is that the probes may be curved as shown or deformed in the manner indicated in phantom lines in FIGURE 6 and still give accurate results since the plastic is capable of transmitting the light in a curved path, and the rods or fibers 61 and shield 62a are flexible.

A primary advantage of the invention resides in the fact that the probes may be made narrow in relation to their length so as to be insertible into a tube or other container having limited access and holding a relatively small quantity of sample. The tubes may be inserted or put into place and held by brackets 67 as shown in FIGURES 1, 2, 3, 5 and 6 or they may have an extension attached thereto as in FIGURE 4 where such an extension fits on electric plugs 44. In this way, the length may be of the order of ten times the diameter of the lower part of the probe or even higher, if desired.

From the foregoing description, it is apparent that I have provided an optical analyzer in probe form which is capable of being immersed into a sample to gather the desired optical data and then being removed therefrom. It is also apparent that the operation may be done either by hand or with automatic handling machines such as the Anthon apparatus cited above. In addition, other analytical operations may be performed on the same sample.

I claim:

1. An optical analyzer in the form of a compact unit capable of being immersed into and withdrawn out of a liquid sample, comprising an elongated generally cylindrical housing having opaque walls for preventing light from passing through the walls, a section of tubing within said housing, the outside of said tubing being located inwardly from the opaque walls to provide a space, light transmitting material in said space, walls attached to the lower end of said housing defining a chamber, said chamber having openings at its upper and lower ends permitting the ingress thereinto and discharge of liquid therefrom upon the immersion and withdrawal, respectively, of said unit into and from the liquid sample, reflecting means on the walls of said chamber for reflecting light transmitted through said light transmitting means and liquid in said chamber back toward the lower end of said tubing, a photoelectric cell located in the lower end of said tubing and facing said chamber, and an incandescent lamp in the upper portion of said housing for directing light through said light transmitting means, said light passing from said light transmitting means through the liquid in said chamber to said reflective means from which the light is reflected back through the liquid onto said photoelectric cell.

2. An optical analyzer as set forth in claim 1 further comprising a reference photoelectric cell located in the upper portion of said tubing and facing said incandescent lamp, said lamp being adapted to direct light directly on said reference photoelectric cell.

3. An optical analyzer in the form of a compact unit capable of being immersed into and withdrawn out of a liquid sample, comprising a generally cylindrical elongated housing having a reflective inner surface for reflecting light directed thereon from inside the housing, said housing having openings adjacent its upper and lower ends permitting the ingress thereinto and discharge of liquid therefrom upon immersion and withdrawal, respectively, of said unit into and from the liquid sample, a support member, the upper end of said housing being connected to said support member, a tube closed at its lower end, means releasably connecting said tube at its upper end to said support member, the outside of said tube being located inwardly from said inner reflecting surface to provide an annular space into which liquid flows upon immersion of said unit into a liquid sample, a photoelectric cell located in the upper end of said tube, an incandescent lamp in the lower end of said tube, a light barrier between said lamp and photoelectric cell in said tube, said lamp being adapted to direct light through liquid in said annular space to said inner reflective surface, from which the light is reflected back through the liquid in said annular space to said photoelectric cell.

References Cited by the Examiner

UNITED STATES PATENTS

| | | | |
|---|---|---|---|
| 2,043,589 | 6/1936 | Muller | 88—14 |
| 2,051,317 | 8/1936 | Sheard et al. | 88—14 |
| 2,299,529 | 10/1942 | Crampton. | |
| 2,324,304 | 7/1943 | Katzman | 88—14 |
| 2,358,020 | 9/1944 | Miller | 88—1 X |
| 2,394,129 | 2/1946 | West | 88—14 |
| 2,455,966 | 12/1948 | Ackley. | |
| 2,580,500 | 1/1952 | Albert | 88—14 |
| 2,727,997 | 12/1955 | Schofield | 88—1 X |
| 2,964,640 | 12/1960 | Wippler | 88—14 X |
| 2,976,763 | 3/1961 | McKeag | 88—1 |
| 3,051,035 | 8/1962 | Root | 88—1 |
| 3,065,354 | 11/1962 | Bird. | |
| 3,123,066 | 3/1964 | Brumley. | |
| 3,141,094 | 7/1964 | Strickler | 250—218 |
| 3,163,767 | 12/1964 | Witt et al. | 88—1 X |
| 3,164,663 | 1/1965 | Gale | 88—14 |

JEWELL H. PEDERSEN, *Primary Examiner.*

T. L. HUDSON, *Assistant Examiner.*

Dedication 3,263,553.—*Hans Baruch*, Berkeley, Calif. PHOTOELECTRIC IMMERSION PROBE. Patent dated Aug. 2, 1966. Dedication filed Mar. 2, 1970, by the assignee, *American Optical Corporation*.

Hereby dedicates the remaining term of said patent to the Public.

[*Official Gazette July 7, 1970.*]